United States Patent Office 3,007,263
Patented Nov. 7, 1961

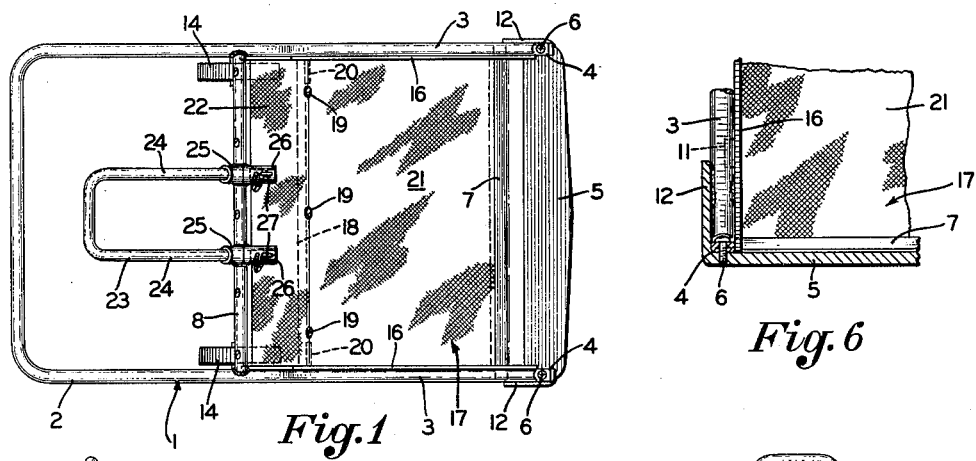
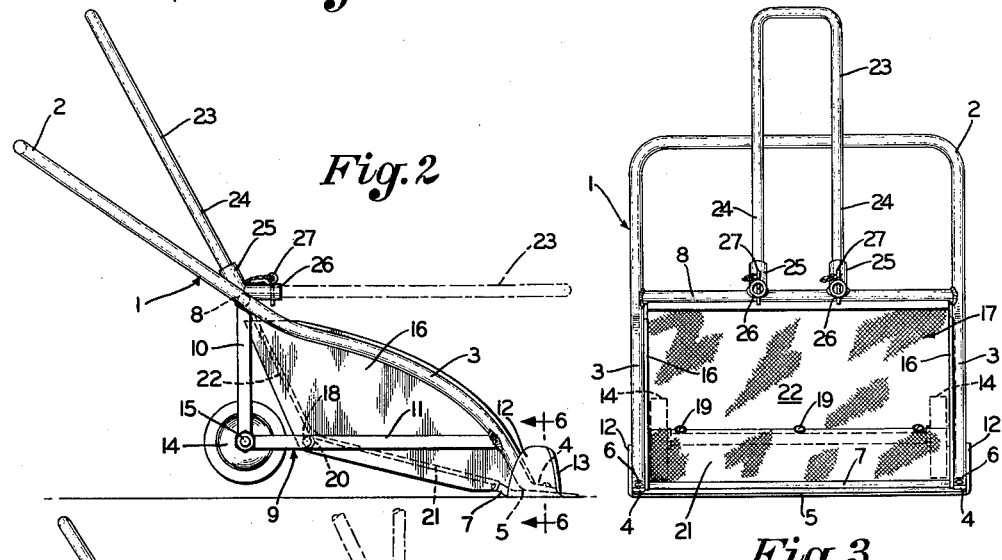
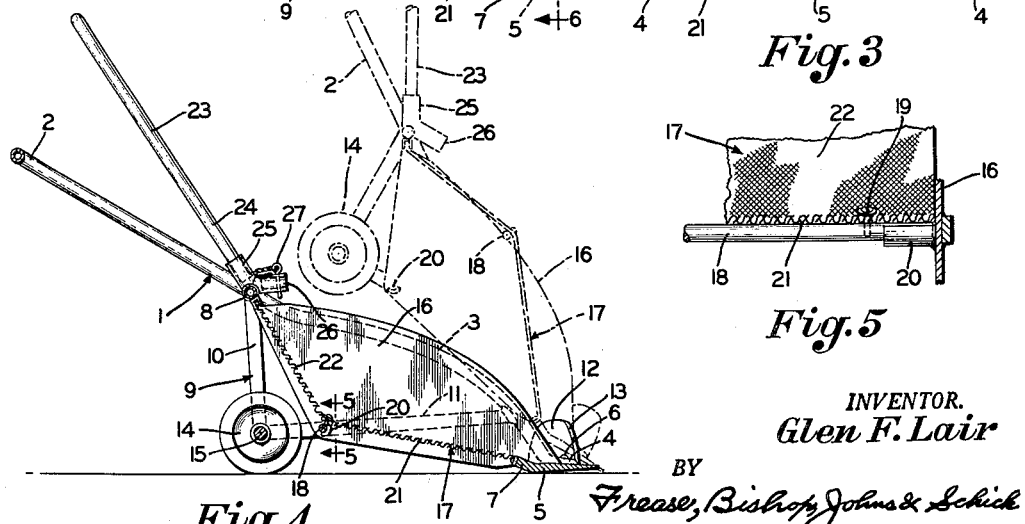

3,007,263
SNOW AND LAWN SHOVEL
Glen F. Lair, 943 Vincent Blvd., Alliance, Ohio
Filed Aug. 19, 1960, Ser. No. 50,721
5 Claims. (Cl. 37—53)

The invention relates to shovels adapted for use upon concrete or similar sidewalks, drives, walks and the like for cleaning snow therefrom, as well as for gathering leaves, twigs, grass cuttings or other litter from lawns or similar areas, and this application is a continuation-in-part of my copending application, Serial No. 7,406, filed February 8, 1960, now abandoned.

It is a primary object of the invention to provide a shovel comprising a frame mounted upon wheels for transporting over a lawn or the like and for acting as fulcrums for raising the shovel over a snow bank, a flexible scoop being carried by the frame and adapted to be inverted or reversed for discharging the contents therefrom.

Another object of the invention is to provide a shovel of this character having releasable means for normally holding the lower portion of the flexible scoop taut so as to prevent it from dragging upon the ground.

A further object of the invention is to provide such a shovel in which vertical side walls of sheet metal or other suitable material are mounted upon each side of the frame and the scoop is in the form of an apron of fabric or other flexible material of a width to fit between said side walls and of suitable length to form a scoop of desired length and depth.

A still further object of the invention is to provide a shovel of the character referred to in which a transversely disposed rod is attached to an intermediate portion of the flexible apron and adapted to be detachably connected to means on the frame or side walls for holding the lower or forward portion of the apron taut to form the bottom of the scoop, the rear or upper portion of the apron forming the back of the scoop while the rigid side walls on the frame form the sides of the scoop.

Another object of the invention is to provide such a shovel having an operating handle for pushing it over an objective surface, and a second or leverage handle for use in tilting the shovel upon its wheels, said leverage handle being adapted to be detachably connected to the frame in a second position for pulling the shovel.

A further object of the invention is to provide a shovel of this character in which a blade is mounted in the frame at the forward end of the scoop, opposite ends of the blade being upturned at 90 degrees forming cutting edges for cutting through frozen crusts upon snow.

The above objects together with others which will be apparent from the drawing and following description, or which may be later referred to, may be attained by constructing the improved snow and lawn shovel in the manner hereinafter described in detail and illustrated in the accompanying drawing.

In general terms, the invention may be described as comprising a frame formed of metal tubing or other suitable material and including an inverted U-shape frame member diagonally disposed forwardly and downwardly. The upper or rear closed end of the U-shape member provides a handle for manually propelling the shovel, and the depending legs thereof provide upper frame members at opposite sides of the shovel.

A pair of angular or L-shape side frame members are provided, the shorter, upright leg of each being attached to an intermediate portion of the corresponding leg of the U-shape frame member, and the longer, substantially horizontal leg thereof being connected to the forward portion of said leg of the U-shape member. A wheel is journalled upon each L-shape frame member at the angle thereof.

The forward ends of the legs of the U-shape frame member are flattened and bent forwardly and a transversely disposed blade is attached thereto. Opposite ends of the blade are bent upwardly and provided with cutting edges for cutting through frozen crust upon snow.

Vertical, longitudinally disposed side walls formed of sheet metal or other suitable material are attached to the side frame members thus formed, and extend downwardly below the same, and form the sides of the scoop of the shovel.

The scoop is in the form of an apron formed of heavy fabric, such as canvas or other suitable flexible material. This apron is of suitable width to extend between the side walls of the frame, and of sufficient length to form the bottom and back walls of the scoop.

The forward end of the flexible apron is attached to the upwardly inclined rear edge of the blade, and the rear end thereof is attached to a transversely disposed bar connected at opposite ends to the side frames at the junction of the upright legs of the L-shape members with the legs of the U-shape member.

A transversely disposed rod is attached to an intermediate portion of the flexible apron and the ends of the rod are adapted to be detachably connected to the rear portion of the substantially horizontal legs of the L-shape frame members. When the rod is so connected to the frame members, the flexible apron is stretched taut to provide a forwardly and slightly downwardly inclined bottom wall of the scoop and an upwardly and slightly rearwardly inclined back wall therefor.

A second or leverage handle is adapted to be detachably connected to the cross bar of the frame in either of two positions. This leverage handle is U-shaped and the legs thereof are adapted to be selectively inserted into a pair of upwardly and slightly rearwardly inclined sockets or a pair of forwardly disposed sockets upon the cross bar of the frame.

Having thus briefly described the invention, reference is now made to the accompanying drawing illustrating a preferred embodiment thereof, in which:

FIG. 1 is a top plan view of the improved shovel;

FIG. 2 is a side elevation of the shovel, showing it with the wheels lifted from the ground and the forward edge of the blade in contact with the ground, in the position in which it is used for shoveling snow;

FIG. 3 is a front elevation of the shovel;

FIG. 4 is a longitudinal sectional view through the shovel with the wheels resting upon the ground, in the position in which it is used upon a lawn, and showing the shovel tilted forwardly and the flexible apron released and inverted or reversed for discharging the contents from the scoop;

FIG. 5 is an enlarged detail sectional view showing the means for detachably connecting the rod of the flexible apron to the frame, taken on the line 5—5, FIG. 4; and FIG. 6 is an enlarged fragmentary section, taken on the line 6—6, FIG. 2, showing one of the upturned cutting edges at one end of the blade.

Reference is now made more particularly to the embodiment of the invention illustrated in the drawing, in which similar numerals refer to similar parts throughout the several views.

The improved snow and lawn shovel to which the invention pertains includes a frame, which may be formed of any suitable material. For the purpose of illustration, this frame is shown as made of metal tubing.

The frame may include the forwardly and downwardly inclined, inverted U-shape member indicated generally at 1, the upper or rear closed portion 2 of which provides a handle for manually propelling the shovel. The forward ends 3 of the legs of this U-shape member are preferably arched upwardly, as best shown in FIG. 2, and provide upper side frame portions.

The extreme forward ends of these legs are disposed substantially horizontally, and preferably flattened, as indicated at 4, and the transversely disposed blade 5 is riveted, bolted, or otherwise attached thereto as shown at 6.

The blade 5 may be formed of steel or other suitable material, and as best shown in FIG. 4, is tapered in thickness toward its forward edge, and the rear edge thereof is preferably inclined slightly upward, as indicated at 7.

The forward lower end of the frame is thus cross-braced by the blade 5, and the rear upper portion thereof may be cross-braced by the transversely disposed member 8, welded or otherwise rigidly attached at opposite ends to intermediate portions of the legs of the U-shape member 1.

Reclining L-shape members, indicated generally at 9, complete the frame structure, the upright leg 10 of each of said members being welded or otherwise rigidly connected to one of the legs of the U-shape member, adjacent to the cross member 8, and the substantially horizontal leg 11 is similarly connected to the corresponding leg of the U-shape member near the forward end thereof.

Opposite ends of the blade 5 are upturned, on the outer sides of the frame, as indicated at 12, and are provided with the forward cutting edges 13 for cutting through frozen crusts on snow, when the shovel is used for cleaning snow from walks and the like.

Wheels 14 are journalled as at 15 upon the L-shape frame members 9, at the angles thereof. These wheels may movably support the shovel when it is moved over a lawn or other surface, and may function as a fulcrum in tilting the shovel over snow banks and the like.

Side walls 16, in the form of sheet metal or other suitable material, are connected to the inner sides of the frame portions 3 and 11, by welding or other suitable means, and form opposite sides of the scoop of the shovel.

An apron, indicated generally at 17, formed of canvas or other suitable flexible material is attached at its forward and rear ends to the rear end 7 of the blade and to the cross bar 8, respectively, and forms the bottom and back wall of the scoop. At a point intermediate the ends of the apron 17, a transversely disposed rod 18 is attached to the underside thereof, as by rivets 19.

Opposite ends of the rod 18 are adapted to be normally engaged in the keepers 20, attached to the side walls 16 or other suitable points at the sides of the frame, for holding the forward portion of the apron taut, to provide the nearly horizontal bottom 21 of the scoop, while the rear portion of the apron forms the upwardly and rearwardly inclined back wall 22 thereof.

A detachable leverage handle may be provided in the form of an inverted U-shape member 23. This member is of considerably less width than the operating handle 2, and the legs 24 thereof are adapted to be inserted into the upwardly and slightly rearwardly disposed socket members 25 mounted on the cross bar 8.

The handle 23 may be removed from the sockets 25 and inserted into the forwardly disposed socket members 26, also located on the cross bar 8, for use in pulling the shovel forwardly, as indicated in broken lines in FIG. 2. In order to retain the handle 23 in the sockets 26, pins 27 may be inserted through suitable openings in the socket members 26 and in the legs 24 of the handle 23.

When using the shovel to clean snow from sidewalks, pavements, or the like, the shovel is held in the position shown in FIG. 2, with the wheels 14 raised slightly above the pavement and the forward edge of the blade in scraping contact with the surface, and is propelled forwardly by means of the handle 2.

Snow is thus easily removed from the surface of the pavement, by the blade 5, and deposited in the scoop of the shovel, upon the apron and between the side walls 16. Any frozen crust upon the snow is easily cut through by the cutting edges 13 on the upturned ends 12 of the blade.

It should be understood that the wheels 14 are not intended to be in contact with the objective surface when the shovel is used for shoveling snow, but, by a slight upward pull upon the handle 2, the rear portion of the shovel should be slightly elevated so as to hold the wheels raised above the surface, as shown in FIG. 2.

When it is necessary to lift the forward end of the shovel over a snow bank at the edge of a sidewalk or drive, the wheels 14 are lowered into contact with the surface and function as a fulcrum upon which the forward end of the shovel may be tilted upward over the snow bank, by downward pressure upon the handle 2, which acts as a lever. If additional leverage is required to raise the front end of the shovel further, the handle 23 may then be used.

In order to discharge the contents of the shovel, with the edge of the blade 5 in contact with the ground, the rear end of the shovel is tilted upwardly and forwardly, the rod 18 on the apron is released from the keepers 20, and the apron is pushed forwardly and outwardly by the foot or hand of the operator, as shown in broken lines in FIG. 4, discharging the contents of the scoop forwardly and outwardly upon the ground.

With the leverage handle 23 connected to the socket members 26, as shown in broken lines in FIG. 2, the shovel may be pulled over a surface by means thereof. The shovel may be used upon a lawn or the like in the manner of a dust pan, so that leaves, twigs, grass cuttings or other litter may be pushed backward over the blade 5 into the scoop, by a broom or the like.

From the above it will be obvious that a simple, efficient and inexpensive shovel is provided which is adapted for use in cleaning snow from sidewalks and the like and equally adapted for cleaning litter from lawns and similar areas, and which includes leverage for lifting it over snow banks or other obstacles, and which is provided with a scoop including a releasable apron for easily and quickly dumping the contents thereof.

It is pointed out that while the entire apron 17 is shown as flexible, that the purpose of the invention may be accomplished by making only the back portion 22 thereof flexible, while the bottom portion 21 may be formed of sheet metal or other substantially rigid material.

It will also be apparent that the shovel is easily maneuvered over the ground in any direction, either by pushing upon the handle 2, or by pulling upon the handle 23, when in the dotted line position of FIG. 2.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A snow and lawn shovel having a frame including a forwardly and downwardly inverted U-shape member, the closed rear end of which provides a handle and the forward portions of the legs of which provide upper side frame members, a pair of L-shape members, the upper end of one leg of each of which is connected to an intermediate portion of a leg of the U-shape member, the forward end of the other leg of each L-shape member being attached to the forward end portion of the corresponding leg of the U-shape member providing rear and lower side frame members, a transversely disposed cross bar connected at opposite ends to intermediate portions of the legs of the U-shape member, a transversely disposed blade connected at opposite ends to the forward ends of the legs of the U-shape member, side walls connected to the inner sides of the upper and lower side frame members, and an apron located between said side walls, means connecting the forward and rear ends of the apron to the rear edge of the blade and to the cross bar respectively and means for detachably connecting an intermediate portion of the apron to the lower side frame members, said apron providing the bottom and back of the shovel scoop and said side walls forming the sides of the scoop.

2. A snow and lawn shovel as defined in claim 1, in which the apron comprises a sheet of flexible material.

3. A snow and lawn shovel as defined in claim 2, including a transversely dipsosed rod connected to an intermediate portion of the apron and means for detachably connecting the ends of said rod to the lower side frame members.

4. A snow and lawn shovel as defined in claim 1, in which at least the portion of the apron between said detachable connecting means and the rear end of the apron is flexible.

5. A snow and lawn shovel having a frame including side frame members, a transversely disposed cross bar connecting the upper rear portions of the side frame members in spaced relation, a transversely disposed blade connecting the forward lower ends of the side frame members in spaced relation, side walls attached to the inner sides of the side frame members, a flexible apron connected at its forward and rear ends to the blade and to the cross bar respectively, a transversely disposed rod connected to an intermediate portion of the apron, and means detachably connecting the ends of said rod to the lower rear portions of the side frame members so that the apron forms the bottom and back of the shovel scoop and the side walls form the sides thereof.

References Cited in the file of this patent

UNITED STATES PATENTS

| | | |
|---|---|---|
| 1,473,572 | Fitzgerald | Nov. 6, 1923 |
| 1,805,489 | Kerr et al. | May 19, 1931 |
| 2,441,449 | Shaw | May 11, 1948 |
| 2,918,299 | Lambert | Dec. 22, 1959 |
| 2,921,728 | Cislak | Jan. 19, 1960 |